United States Patent
Chen

(10) Patent No.: US 9,647,594 B2
(45) Date of Patent: May 9, 2017

(54) FLYBACK CONTROL MODE-BASED CONTROLLER AND MOTOR-CONTROLLING METHOD THEREOF

(71) Applicant: Xiping Chen, Chengdu (CN)

(72) Inventor: Xiping Chen, Chengdu (CN)

(73) Assignees: Shanghai Dingte Electrical Applicances Co., Ltd., Shanghai (CN); Xiping Chen, Chengdu, Sichuan (CN)

( * ) Notice: Subject to any disclaimer, the term of this patent is extended or adjusted under 35 U.S.C. 154(b) by 0 days.

(21) Appl. No.: 14/902,338

(22) PCT Filed: Jan. 7, 2015

(86) PCT No.: PCT/CN2015/070247
§ 371 (c)(1),
(2) Date: Dec. 30, 2015

(87) PCT Pub. No.: WO2015/081903
PCT Pub. Date: Jun. 11, 2015

(65) Prior Publication Data
US 2016/0141995 A1 May 19, 2016

(51) Int. Cl.
*H02K 33/00* (2006.01)
*H02P 25/092* (2016.01)

(52) U.S. Cl.
CPC ................... *H02P 25/092* (2016.02)

(58) Field of Classification Search
CPC ...... H02P 1/46; H02P 3/18; H02P 6/00; H02P 23/00; H02P 25/00; H02P 27/00
USPC ... 318/37, 119, 556, 400.01, 400.02, 400.05, 318/400.14, 400.15, 700, 701, 721, 799, 318/800, 801, 430, 432, 437; 363/40, 44, 363/95, 120, 174; 123/598, 607, 615; 324/436, 442
See application file for complete search history.

(56) References Cited

U.S. PATENT DOCUMENTS 5,689,164 A * 11/1997 Hoft .................... H02P 25/0925
318/400.17

* cited by examiner

*Primary Examiner* — Antony M Paul
(74) *Attorney, Agent, or Firm* — Raymond Y. Chan; David and Raymond Patent Firm

(57) ABSTRACT

A flyback control mode-based controller includes a power supply circuit, a position-checking circuit, a current-checking circuit, a control circuit, and a power output circuit. The power output circuit includes a controlled energy conversion unit. The energy conversion unit includes a control switch and an energy conversion circuit. The energy conversion circuit uses the capacitor C circuit, the inductor L circuit, or the LC circuit to connect parallelly or serially with an inductor in a motor winding L so as to form an oscillation circuit, such that periodic oscillations with attenuation are enabled by relying on the energy stored in the motor winding L. By applying the controller to motors having forward control mode or motors having flyback control mode, the current to be released by the motor during discharging can be repeated used, thereby achieving maximum energy conservation.

13 Claims, 4 Drawing Sheets

Main Cycle $T_0 = 2\pi\sqrt{LC}$

Half Attennation Cycle $T_1 = 4 \sim 6T_0$

FLYBACK CONTROL MODE-BASED CONTROLLER AND MOTOR-CONTROLLING METHOD THEREOF

CROSS REFERENCE OF RELATED APPLICATION

This is a non-provisional application that claims priority to international application number PCT/CN2015/070247, international filing date Jan. 7, 2015, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a motor control, and more particularly to a flyback control mode-based controller and the motor-controlling method thereof.

Description of Related Arts

The operating principle for a power supplying system is that the power supplying system outputs power is defined as a forward control mode. Then, the power supplying system utilizing the stored energy as an output when the power source is switched off is defined as the "flyback" control mode.

Accordingly, the existing electromechanical device comprises an electrical system, a mechanical system, and a magnetic system that generates a magnetic field to magnetically link the electrical system with the mechanical system. According to the conservation of energy principle, electrical energy generated by the power input=the increase of stored energy in the magnetic field+the energy loss in the system+the mechanical energy output. Under the lossless conditions, i.e. ignoring the energy loss, the equation of the energy transfer is that: $dW_f = dW_e + dW_m$, where $dW_e$ is the differential electric-energy input, $dW_f$ is the differential change in magnetic stored energy, and $dW_m$ is the differential mechanical energy output. For the existing motor assembly, the stored energy in the magnetic field cannot be transformed into mechanical energy. During the phase shift, the remaining energy will be discharged to produce a negative torque. In traditional computing theory, this discharged energy will also be omitted or ignored.

The working mode of the existing motor assembly is the forward control mode, wherein during the ascending current phase, a working cycle of a three-phase motor is ⅓, such that the motor assembly generates the output when increasing the current in each cycle. In particular, the motor assembly can provide motoring as the positive torque when inputting power and can provide negative torque when releasing power.

FIG. 2 illustrates the power circuit of the motor assembly through the current chopping process. There are two different types, i.e. a single diode mode and a double diode mode, and their operations are slightly different. FIG. 2 illustrates the power circuit of the motor assembly with the double diode mode. The advantages of the double diode mode are that the discharge is rapid and energy can be stored through the feedback power from the two diodes. Therefore, the double diode mode is suitable for higher speed application (please see FIG. 3 that illustrates the descending current waveform). On the other hand, the energy cannot be stored through the feedback power in the single diode mode, wherein the energy saved at the diode will be discharged until it is used up. During the motor current chopping process, the work of the motor assembly is provided by the ascending current when the input current is increasing to reach the chopping threshold. Once the input current reaches the chopping threshold, there will be no work for the motor assembly by cutting off the power supply. Once the motor current chopping process is completed, the motor assembly will re-connect to the power supply. For the switch on-and-off of the reluctance motor, its forward control mode is that when the yoke pole of the rotor is aligned with one particular yoke pole of the stator, the corresponding phase coil winding is cut off and the preceding phase coil winding at the rotational direction is then connected. As shown in FIG. 1, when the motor assembly generates a counter-clockwise output, the solenoid coil is initially energized to determine its location. Then, other solenoid coils are energized in sequent at the rotation direction. Therefore, by determining the locations of the solenoid coils, a detection signal can be generated to sequentially connect and disconnect the corresponding solenoid coils. For example, the winding A is electrically connected when the photoelectric signal a is generated. The winding B is electrically connected and the winding A is electrically disconnected when the photoelectric signal b is generated.

According to the forward control mode, during the current chopping process, the current is gradually reduced from its maximum value, wherein there is no work provided by the motor assembly. When the power is cut off, the current is also gradually reduced from its maximum value. At the same time, the phase of current is changing that the corresponding winding is initially connected and is insufficient to generate enough power to overcome the negative torque from the preceding winding. As a result, the motor assembly will be operated in an idle condition. Only when the positive torque generated by the corresponding winding is larger than the negative torque generated by the preceding winding, the motor assembly will continue to generate the rotational power. This is the same reason of the presence of torque pulsations, i.e. torque ripple for the reluctance motor.

SUMMARY OF THE PRESENT INVENTION

The invention is advantageous in that it provides a motor control to solve the above mentioned problems, wherein the motor control can control the motor in forward control mode or flyback control mode to release current or to re-use the energy during the current chopping process, so as to provide an energy saving control for the flyback control mode of the motor.

For the flyback control mode of the motor, the principle of the energy conservation ignores the below formula:

$$W_f = W_e + W_m = \int eidt - \int F_e dx$$

Accordingly, when the electromagnetic system of the motor absorbs energy, the motor does not generate any work in the flyback control mode, i.e. $W_m = 0$, wherein:

$$W_e = W_f$$

Therefore, the electromagnetic energy is stored in the electromagnetic system. When the electromagnetic energy is released therefrom, there is no energy input into the motor, i.e. $W_e=0$, wherein:

$$W_m=W_f$$

In other words, in the flyback control mode of the motor, the electromagnetic energy is stored and is totally converted into mechanical energy. Therefore, it can be shown the difference between the forward control mode and the flyback control mode of the motor. The use of flyback control mode can save energy for the motor.

The control method for the motor in the flyback control mode is that: activate the motor in the forward control mode, and when the revolving speed of the motor reaches a predetermined speed threshold of the control program, the controller shifts the motor from the forward control mode to the flyback control mode. For example, the yoke pole of the rotor is rotated at the B phase as shown in FIG. 1, wherein the rotor is driven to rotate at the counterclockwise direction. When the b positioning signal is generated, the A phase of the electromagnetic coil is initially electrified and the rotor is kept rotating from the A phase. When the c positioning signal is generated that indicates the rotor is rotated at the C phase from the B phase, the A phase of the electromagnetic coil is cut off and the B phase of the electromagnetic coil is electrified. Since the A phase of the electromagnetic coil is previously electrified to reach its maximum charging current and the induction current cannot be changed, the A phase of the electromagnetic coil will start to discharge the current from its maximum level. So, the discharging current will generate a strong magnetic field to magnetically and rapidly attract the yoke pole of the rotor from the C phase to the A phase. The working process of the rotor for other phases should be the same as mentioned above.

According to the present invention, the foregoing and other objects and advantages are attained by a flyback control mode-based controller, which comprises a power supply circuit, a position detection circuit, a current detection circuit, a control circuit, and a power output circuit. In response to the position of the rotor detected by the position detection circuit, the controller generates the corresponding positioning signal to control each phase of the motor winding to release the stored energy through the power output circuit for generating work at the time when the power of the motor is cut off by the controller. The power output circuit comprises an energy conversion unit in a controllable manner, wherein the energy conversion unit comprises a control switch and an energy conversion circuit. The energy conversion circuit is configured to include at least one of a capacitor C circuit, an inductor L circuit, and a LC circuit. When the power supply is disconnected, the capacitor C circuit, the inductor L circuit, and/or the LC circuit of the energy conversion circuit is inducted with an inductor of a motor winding (electromagnetic coil) in parallel or in series to form an oscillation circuit. Therefore, the energy is pre-stored in the motor winding assembly to achieve attenuation of periodic oscillations.

Another advantage of the invention is to provide a flyback control mode-based controller, wherein the control switch is a bi-directional conduction switch having one terminal connected to a terminal of the energy conversion circuit and another terminal connected to a terminal of the motor winding. Another terminal of the motor winding is connected another terminal of the energy conversion circuit. The control switch is selectively actuated to cut off or connected the energy conversion circuit from the motor winding.

Another advantage of the invention is to provide a flyback control mode-based controller, wherein the energy output circuit comprises a double-diode control. The energy output circuit comprises a power source U, a two switch transistors T1, T2, two flyback diodes D1, D2, and a motor winding L having two endpoints A, B. In particular, the switch transistor T1 has two terminals respectively connected to a positive terminal of the power source U and to the endpoint A where the terminal of the motor winding L is connected thereto. Another terminal of the motor winding L is connected the terminal of the switch transistor T2 at the endpoint B, wherein another terminal of the switch transistor T2 is connected to the negative terminal of the power source U. The cathode terminal of the flyback diode D1 is connected to the positive terminal of the power source U at the endpoint B. The cathode terminal of the flyback diode D2 is connected to the negative terminal of the power source U and the anode terminal of the flyback diode D2 is connected at the endpoint A. The control terminals of the switch transistors T1, T2 are connected to the control circuit. The energy conversion unit is connected between the endpoints A, B. The energy conversion unit comprises a control switch K and a capacitor C. A terminal of the control switch K is connected at the endpoint A and another terminal of the control switch K is connected to one terminal the capacitor C, wherein another terminal of the capacitor C is connected at the endpoint B.

Another advantage of the invention is to provide a flyback control mode-based controller, wherein for the single diode control mode, the energy output circuit, which is configured to include a power source U, two switch transistors T1, T2, two flyback diodes D1, D2, a capacitor C, and a motor winding L having two endpoints A, B. In particular, the switch transistor T1 has two terminals respectively connected to a positive terminal of the power source U and to the endpoint A where the terminal of the motor winding L is connected thereto. Another terminal of the motor winding L is connected to negative terminal of the power source U at the endpoint B. A terminal of the switch transistor T2 is connected to a terminal of the capacitor C and another terminal of the switch transistor T2 is connected at the endpoint B. Another terminal of the capacitor C is connected at the endpoint A. The cathode terminal of the flyback diode D1 is connected to the positive terminal of the power source U while the negative terminal of the power source U is connected at the endpoint A. The flyback diode D2 and the switch transistor T2 are connected in parallel, wherein the cathode terminal of the flyback diode D2 is connected to the capacitor C and the anode terminal of the flyback diode D2 is connected at the endpoint B.

Another advantage of the invention is to provide a flyback control mode-based controller, wherein when the attenuation is achieved via the energy conversion unit during the periodic oscillation, the current flow direction of the motor winding L will not be changed through the single control cycle.

Another advantage of the invention is to provide a flyback control mode-based controller, wherein for the single coil controlling mode, the energy output circuit, which is configured to include a power source U, two switch transistors T1, T2, two flyback diodes D1, D2, a capacitor C, two control switches K1, K2, and a motor winding L having two endpoints A, B. In particular, a terminal of the switch transistor T1 is connected to the positive terminal of the power source U while another terminal of the switch transistor T1 is connected to a terminal of the motor winding L at the endpoint A. Another terminal of the motor winding L is connected to a terminal of the switch transistor T2 at the endpoint B. Another terminal of the switch transistor T2 is connected to the negative terminal of the power source U. The cathode terminal of the flyback diode D1 is connected to the capacitor C and the anode terminal of the flyback diode D1 is connected at the endpoint B. The cathode terminal of the flyback diode D2 is connected at the endpoint A and the anode terminal of the flyback diode D2 is connected to the negative terminal of the power source U. A terminal of the control switch K1 is connected at the endpoint A and another terminal of the control switch K1 is connected to the capacitor C. A terminal of the control switch K2 is connected at the endpoint B and another terminal of the control switch K2 is connected to the negative terminal of the power source U. Another terminal of the capacitor C is connected to the negative terminal of the power source U.

Another advantage of the invention is to provide a flyback control mode-based controller, wherein the power output circuit is a star-shaped winding connection. The power output circuit is configured to have a power source U, a plurality of switch transistors T1, T2, T3, T4, T5, T6, two flyback diodes D1, D2, a capacitor C, a plurality of control switches K, K1, K2, an isolating diode D, and a plurality of three-phased motor windings L1, L2, L3. Terminals of the switch transistors T1, T3, T5 are connected to a terminal of the control switch K while another terminal of the control switch K is connected to the positive terminal of the power source U. Another terminals of the switch transistors T1, T3, T5 are connected to the terminals of three-phased motor windings L1, L2, L3. Another terminals of the three-phased motor winding L1, L2, L3 are connected with each other. Terminals of the switch transistors T2, T4, T6 are connected to the terminals of the switch transistors T1, T3, T5 while another terminals of the switch transistors T2, T4, T6 are connected to the negative terminal of the power source U. The cathode terminal of the flyback diode D1 is connected to the capacitor C and the control switch K1 in parallel connection. The anode terminal of the flyback diode D1 is connected to a terminal of the control switch K2. The cathode terminal of the flyback diode D2 is connected to the terminal of control switch K2 while the anode terminal of the flyback diode D2 is connected to the capacitor C and the control switch K2 in parallel connection. A terminal of the isolating diode D is connected to the switch control K1 and the flyback diode D2, while another terminal of the isolating diode D is connected to the switch transistors T1, T3, T5 and the control switch K in parallel connection.

In accordance with another aspect of the invention, the present invention comprises a flyback motor controlling method, which control and release the stored energy in the motor winding to the yoke pole of the rotor for generating work done. In addition, when the flyback control mode-based controller is used for the motor in the flyback control mode, the control method is arranged to ensure the motor winding to store the energy when the motor winding is idle, i.e. no work done, and to instantaneously release the stored energy to the yoke pole of the rotor for generating work done. When the flyback control mode-based controller is used for the motor in the forward control mode, the control method is arranged to ensure the motor winding to store the energy and to release the stored energy to the yoke pole of the rotor for generating work done during the energy releasing process.

Accordingly, the above control method can controllably release the stored energy from the motor winding and exchange the stored energy thereof with an energy storing circuit through the oscillation. In other words, the motor winding can release the stored energy to the yoke pole of the rotor for generating work done. The process can be a reciprocating process until the energy stored in the motor winding drops below a predetermined threshold or the oscillation is stopped by the control program.

The control method relies on the loading status of the control circuit to determine whether the energy circulation control is activated for circulating the energy. For the controller of the permanent magnet motor, the configuration of the power conversion circuit and the control parameters of the control circuit are set in the same control cycle, such that the current flow direction of the motor winding is remained unchanged.

Accordingly, the controlling method comprises the steps of:

(a) through the control circuit, configuring a control detection circuit to monitor any current change of a main circuit and to determine whether the main circuit is needed to connect to a power conversion circuit;

(b) through the control circuit, configuring a control switch at the power conversion circuit to selectively connect or disconnect the power conversion circuit with the main circuit;

(c) when the control circuit determines the process of energy conversion, activating the control switch via a pre-set control program to operatively connect the power conversion circuit with a motor winding to form an oscillation circuit, so as to continuously exchange the energy therebetween through oscillation until the energy stored in the motor winding drops below a predetermined threshold or the oscillation is stopped by the control program.

For the non-permanent magnet type motor, the control method of the control circuit is shown as follows: activating the forward control mode of the motor that when the revolving speed of the motor reaches a predetermined speed threshold of the control program, shifting the motor from the forward control mode to the flyback control mode, and then, according to the loading status of the motor, controllably operating the motor among different working control modes of the flyback control, the flyback control with energy circulation control, the forward control alternating with the flyback control via the control circuit. For the permanent magnet type motor, the control method of the control circuit is shown as follows: activating the forward control mode of the motor that when the revolving speed of the motor reaches a predetermined speed threshold of the control program, selectively incorporating the energy circulation control via the control circuit in response to the loading status of the motor so as to controllably operate the motor with the corresponding control. It is worth mentioning that the configuration of the power conversion circuit and the control parameters of the control circuit are set in the same control cycle, such that the current flow direction of the motor winding is remained unchanged.

By incorporating the flyback control mode-based controller with the motor at either the forward control mode or the flyback control mode, the controller is adapted to release current or to re-use the energy during the current chopping process, so as to provide an energy saving control for the flyback control mode of the motor. The controller of the present invention can be operated under a relatively small current. The controller of the present invention is adapted for not only being used with a AC power supply but also being used with other forms of power supply such as solar power supply or rechargeable power supply. In addition, the controller of the present invention serves as a motor, a power generator, or electromagnetic braking power. In other words, the controller of the present invention is adapted to incorporate with a compressor of an air conditioning system, an electric fan, an electric sewing machine, an electric vehicle, and other applications.

The flyback control mode-based controller of the present invention has the following advantages:

1. Comparing the motor having the controller of the present invention with the conventional permanent magnet motor, the controller of the present invention ensures a larger torque generated by the motor under a relative small current, wherein a ratio of torque and current is enlarged to achieve different special requirements related to the ratio of torque and current.

2. The structure and time determination of the motor is simplified by the controller of the present invention for easy modeling and simulation.

3. The circuit configuration of the controller of the present invention is simple and is easily modified for different frequency controls.

4. Comparing with the conventional permanent magnet motor, the motor having the controller does not require any permanent magnet and can save about 15%-20% of the use of copper and iron in the motor.

5. Comparing with the conventional permanent magnet motor, the controllable parameters of the motor having the controller can be increased for optimizing the performance of the motor.

6. The motor having the controller has advantages of compact size, lightweight, and easy of power expansion, and has better power density ratio and torque density ratio.

7. The motor incorporates with the controller to enhance the efficiency and energy performance.

8. The structure of the controller is modularized to enhance the reliability.

9. The working operation of the motor having the controller is under low working temperature, no pulsation, and low noise generation.

10. The controller can be set in different configurations depending on the loading status of the motor so as to combine the flyback control technologies with the control method of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Accordingly, the flyback control mode-based controller of the present invention comprises a power supply circuit, a position detection circuit, a current detection circuit, a control circuit, and a power output circuit. The power output circuit comprises an energy conversion unit in a controllable manner, wherein the energy conversion unit comprises a control switch and an energy conversion circuit. The energy conversion circuit is configured to include at least one of a capacitor C circuit, an inductor L circuit, and a LC circuit. When the power supply is disconnected, the capacitor C circuit, the inductor L circuit, and/or the LC circuit of the energy conversion circuit is inducted with an inductor of a motor winding (electromagnetic coil) in parallel or in series to form an oscillation circuit. Therefore, the energy is pre-stored in the motor winding assembly to achieve attenuation of periodic oscillations.

Figure 1:
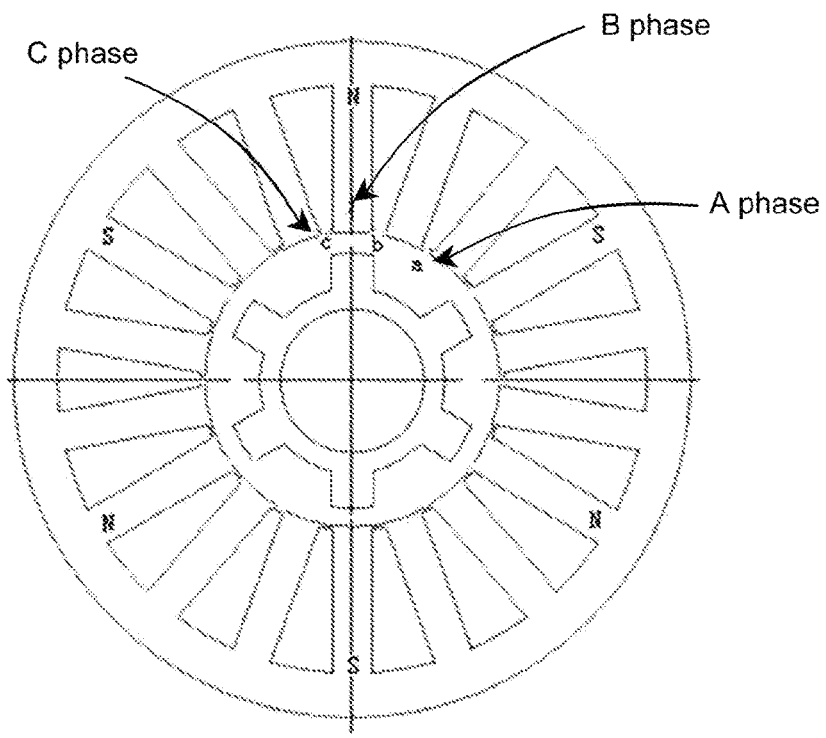
FIG. 1 is a schematic diagram of a flyback motor assembly.
Figure 4:
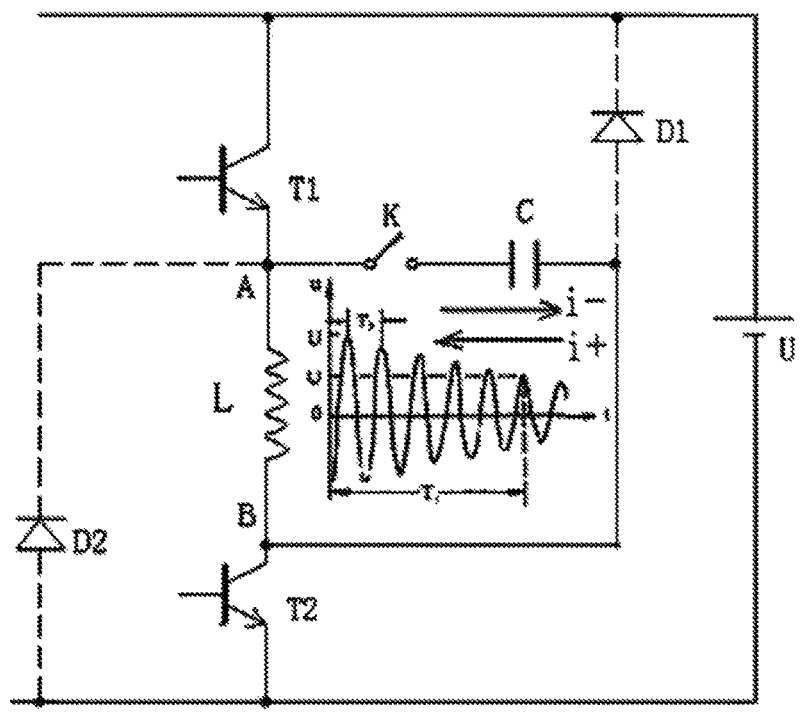
FIG. 4 is a circuit diagram illustrating the reluctance motor in the double diode flyback control mode.

Embodiment 1: As shown in FIG. 4, the control switch of the motor or the conventional reluctance motor in FIG. 1 is a 2-way connection switch, wherein a terminal of the control switch is connected to a terminal of the energy conversion circuit and another terminal of the control switch is connected to a terminal of the motor winding. A second terminal of the motor winding is connected to the second terminal of the energy conversion circuit. Therefore, the control switch is actuated in an on and off manner to selectively connect and disconnect between the energy conversion circuit and the motor winding.

For the double diode control mode, the energy output circuit, which is configured to include a power source U, two switch transistors T1, T2, and two flyback diodes D1, D2, and a motor winding L having two endpoints A, B. In particular, the switch transistor T1 has two terminals respectively connected to a positive terminal of the power source U and to the endpoint A where the terminal of the motor winding L is connected thereto. Another terminal of the motor winding L is connected the terminal of the switch transistor T2 at the endpoint B, wherein another terminal of the switch transistor T2 is connected to the negative terminal of the power source U. The cathode terminal of the flyback diode D1 is connected to the positive terminal of the power source U at the endpoint B. The cathode terminal of the flyback diode D2 is connected to the negative terminal of the power source U and the anode terminal of the flyback diode D2 is connected at the endpoint A. The control terminals of the switch transistors T1, T2 are connected to the control circuit. The energy conversion unit is connected between the endpoints A, B. The energy conversion unit comprises a control switch K and a capacitor C. A terminal of the control switch K is connected at the endpoint A and another terminal of the control switch K is connected to one terminal the capacitor C, wherein another terminal of the capacitor C is connected at the endpoint B.

Figure 2:
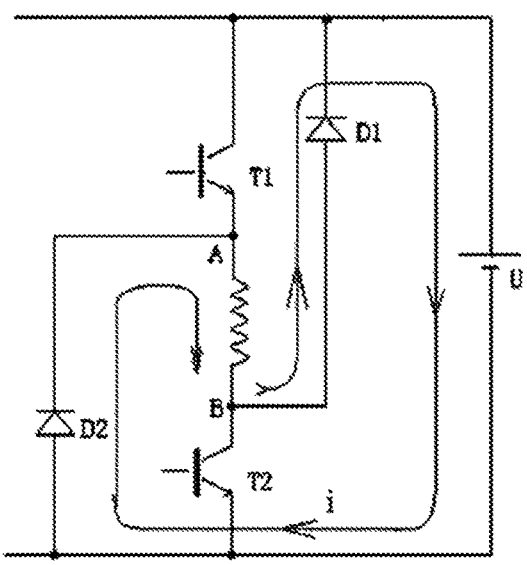
FIG. 2 illustrates a conventional power circuit for the motor assembly.
Figure 3:
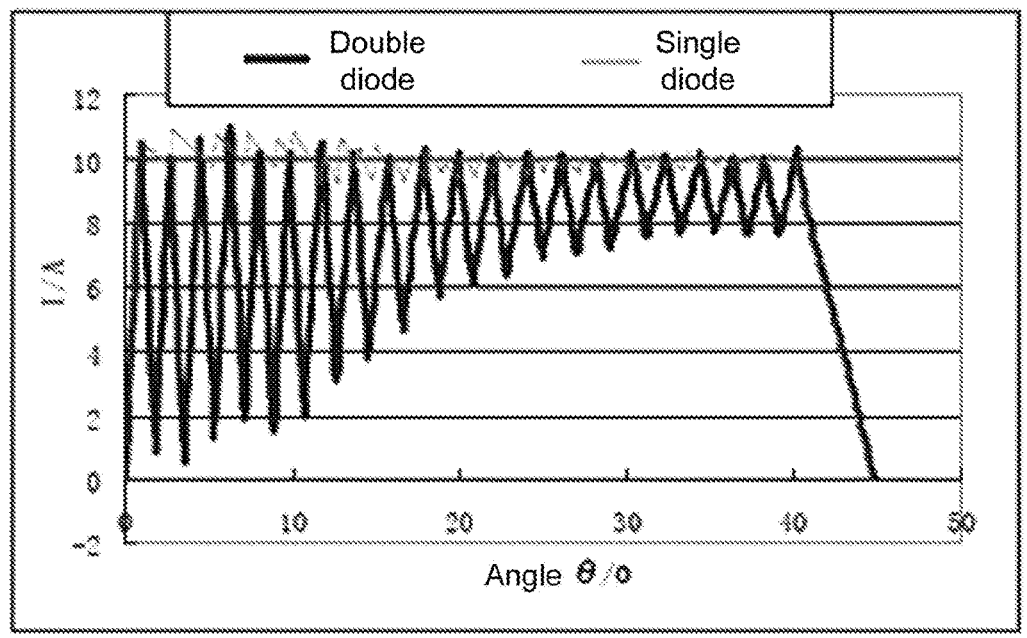
FIG. 3 illustrates a conventional current chopping process for the motor assembly.

As shown in FIG. 2, during the cut off process at the point the energy conversion unit is disable, there are two different types, i.e. a single diode mode and a double diode mode, for the motor, wherein their operations are slightly different. The advantages of the double diode mode are that the discharge is rapid and energy can be stored through the feedback power from the two diodes. Therefore, the double diode mode is suitable for higher speed application. On the other hand, the energy cannot be stored through the feedback power in the single diode mode, wherein the energy saved at the diode will be discharged until it is used up.

As shown in FIG. 4, when the energy conversion unit is activated to incorporate with the motor, the difference between the operations of the single diode mode and a double diode mode is minimized. When the switch transistors T1, T2 are off, the input of the motor winding L is cut off and the control switch K is closed to connect the capacitor C with the motor winding L in parallel so as to form a LC oscillation circuit. Assuming that the voltage of the capacitor C is zero, the discharging current of the motor winding L flows at the counterclockwise direction to charge the capacitor C in a reversed manner, wherein the polarities of the capacitor C are negative at the left side and positive at the right side. When the current of the motor winding L is decreased to zero, the capacitor C is fully charged in a reversed manner at its maximum level. Then, the capacitor C starts to discharge to the motor winding L in a reversed manner, wherein the discharging current of the capacitor C flows at the clockwise direction. As a result, damped oscillations are formed until the control switch K is cut off or the current in the circuit is reduced below a preset lower threshold.

As shown in FIG. 4, since the control switch K is closed, the current flows within the LC oscillation circuit without passing through the flyback diodes D1, D2. Therefore, the flyback diodes D1, D2 can be omitted in a practical application, so that the connections of the flyback diodes D1, D2 are shown in dotted lines.

FIG. 4 illustrates the circuit configuration utilizing the flyback control based-mode controller for energy circulation (regeneration). After simply completing several cycles of oscillation, energy can be circulated to provide excellent energy saving ability. Especially for a small output motor, the advantages are: select the appropriate width and number of yoke pole, use the flyback control based-mode (need to select the appropriate control voltage and control angle θ), and during energy circulation (regeneration), complete a single control process before the oscillation energy is exhausted (or before it reaches the preset lower threshold), such that the motor is rotated with a single yoke pole width within the shortest time period.

Figure 5:
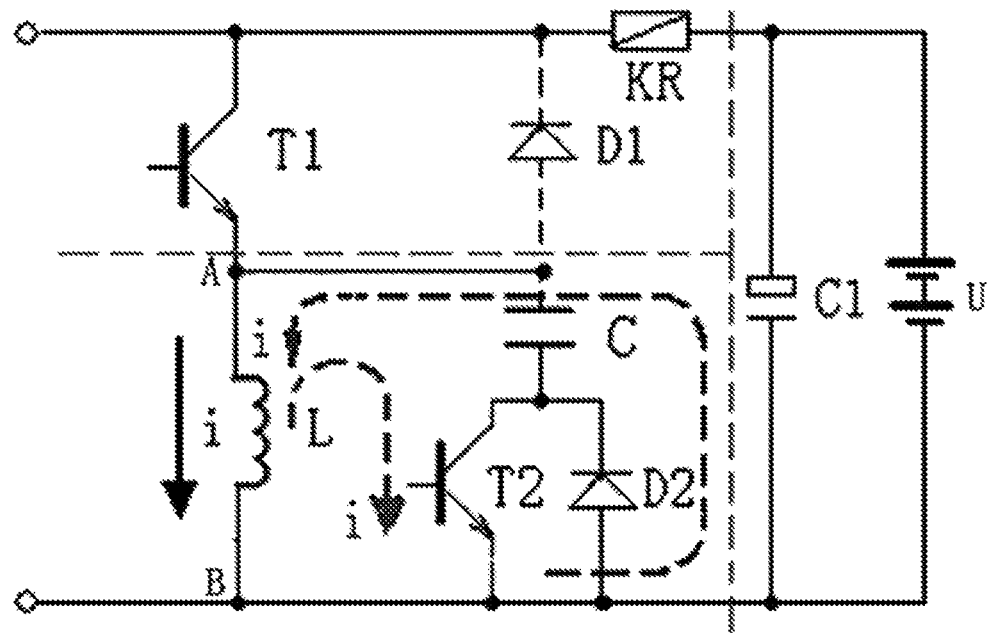
FIG. 5 is a circuit diagram illustrating the reluctance motor in the single diode flyback control mode.

Embodiment 2: As shown in FIG. 5, the control switch of the motor or the conventional reluctance motor in FIG. 1 is a 2-way connection switch, wherein a terminal of the control switch is connected to a terminal of the energy conversion circuit and another terminal of the control switch is connected to a terminal of the motor winding. A second terminal of the motor winding is connected to the second terminal of the energy conversion circuit. Therefore, the control switch is actuated in an on and off manner to selectively connect and disconnect between the energy conversion circuit and the motor winding.

For the single diode control mode, the energy output circuit, which is configured to include a power source U, two switch transistors T1, T2, two flyback diodes D1, D2, a capacitor C, and a motor winding L having two endpoints A, B. In particular, the switch transistor T1 has two terminals respectively connected to a positive terminal of the power source U and to the endpoint A where the terminal of the motor winding L is connected thereto. Another terminal of the motor winding L is connected to negative terminal of the power source U at the endpoint B. A terminal of the switch transistor T2 is connected to a terminal of the capacitor C and another terminal of the switch transistor T2 is connected at the endpoint B. Another terminal of the capacitor C is connected at the endpoint A. The cathode terminal of the flyback diode D1 is connected to the positive terminal of the power source U while the negative terminal of the power source U is connected at the endpoint A. The flyback diode D2 and the switch transistor T2 are connected in parallel, wherein the cathode terminal of the flyback diode D2 is connected to the capacitor C the anode terminal of the flyback diode D2 is connected at the endpoint B.

Figure 6:
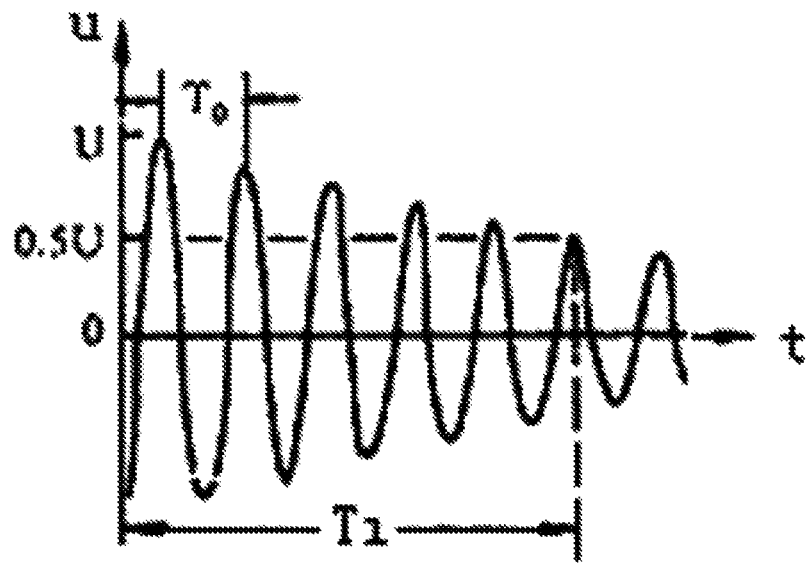
FIG. 6 is a schematic diagram illustrating the voltage waveform of capacitance C in FIG. 5 during oscillation.

FIG. 5 illustrates the circuit configuration utilizing the single diode control to connect with the motor in a star-connection structure, wherein the neutral is grounded. It is worth mentioning that when removing the capacitor C, the transistor T2, and the diode D2, the circuit is configured as a conventional control circuit of the reluctance motor. The diode D1 serves as a protective diode. The capacitor C, the transistor T2, and the diode D2 form the energy conversion circuit. FIG. 6 illustrates the voltage waveform of the capacitor C during the oscillation process.

As shown in FIG. 5, the motor can be normally operated in both forward control mode and the flyback control mode, wherein the working principle is that: when a photoelectric signal is generated to energize the motor winding L and when the current thereof is increased to reach the chopping threshold, the transistor T1 is cut off (i.e. the chop off but no longer being connected), and the transistor T2 is connected. At the same time, since the current direction of the motor winding L is unchanged and the current valve of the motor winding L reaches its maximum, the diode D2, the motor winding L, and the capacitor C form a circuit to charge the capacitor C, wherein the polarities of the capacitor C are negative at the upper side and positive at the lower side. When the current of the motor winding L is decreased to zero, the capacitor C is fully charged at its maximum level. The discharging current from the capacitor C passes through the transistor T2, the motor winding L, and the capacitor C to form the circuit. The repeated cycle thereof will form the oscillation circuit with attenuation ability. Before reaching the preset lower threshold (or the stored oscillation energy is exhausted), or the subsequent photoelectric signal is generated, the transistor T2 is cut off and the oscillation circuit is cut off to complete one single control process.

During the control of the energy conversion unit and assuming that the voltage of the capacitor C is zero, the energy is exchanged between the capacitor C and the motor winding L. FIG. 6 illustrates the waveform of the capacitor C. When selecting reasonable parameters of the capacitor C, the attenuation during oscillation process will be minimized. In other words, through the time required for the one single oscillation process at each single yoke pole, it will achieve the best control effect. Through the LC oscillation process, the energy will be fully exchanged. Therefore, during the discharging process of the capacitor C, the motor winding L will absorb the energy for generating work, so as to achieve the re-usable stored energy.

Embodiment 3: For the permanent magnet motor that the permanent magnet is required, the current flow direction thereof is predetermined. Through the single control cycle (through the same yoke pole), the current flow direction cannot be changed, which is considered as the essential prerequisite for the energy conversion technology. When the attenuation is achieved via the energy conversion unit during the periodic oscillation, the current flow direction of the motor winding L will not be changed through the single control cycle.

For the permanent magnet motor, the wiring connection methods may be different, such that the corresponding structure of the energy conversion unit will be slightly different.

Figure 7:
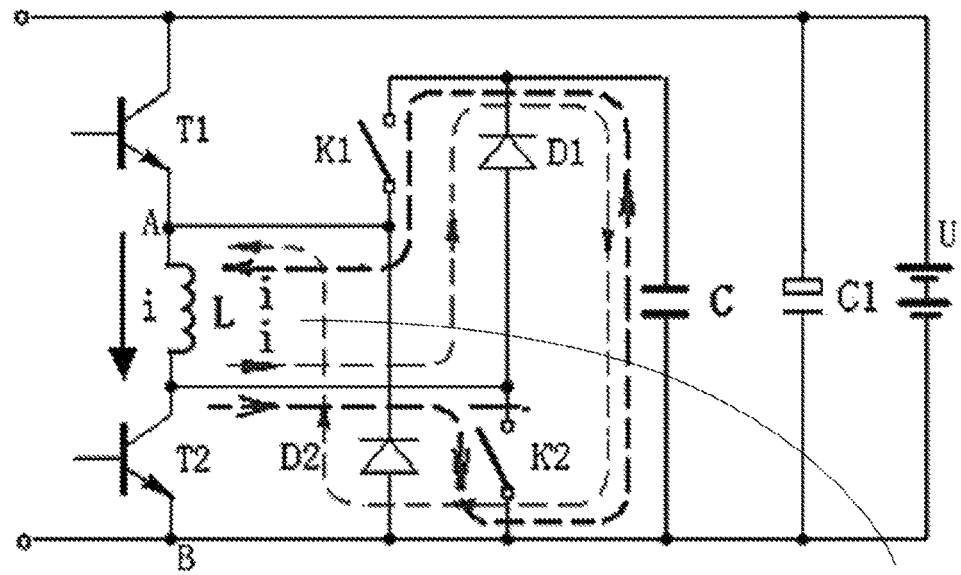
FIG. 7 is a schematic diagram illustrating the permanent magnet motor using a single coil control.

FIG. 7 illustrates the single coil controlling method, wherein the energy output circuit utilizes the single coil controlling method. The energy output circuit is configured to include a power source U, two switch transistors T1, T2, two flyback diodes D1, D2, a capacitor C, two control switches K1, K2, and a motor winding L having two endpoints A, B. In particular, a terminal of the switch transistor T1 is connected to the positive terminal of the power source U while another terminal of the switch transistor T1 is connected to a terminal of the motor winding L at the endpoint A. Another terminal of the motor winding L is connected to a terminal of the switch transistor T2 at the endpoint B. Another terminal of the switch transistor T2 is connected to the negative terminal of the power source U. The cathode terminal of the flyback diode D1 is connected to the capacitor C and the anode terminal of the flyback diode D1 is connected at the endpoint B. The cathode terminal of the flyback diode D2 is connected at the endpoint A and the anode terminal of the flyback diode D2 is connected to the negative terminal of the power source U. A terminal of the control switch K1 is connected at the endpoint A and another terminal of the control switch K1 is connected to the capacitor C. A terminal of the control switch K2 is connected at the endpoint B and another terminal of the control switch K2 is connected to the negative terminal of the power source U. Another terminal of the capacitor C is connected to the negative terminal of the power source U.

The control structure is usually the top and bottom diode structure for the single coil control method of the permanent magnet motor, as shown in FIG. 7. Through the normal control method when controlling the current chopping process, a circuit is formed via the flyback diodes D1, D2. Accordingly, since the connection between the cathode terminal of the flyback diode D1 and the power source U is cut off, it can only process the single diode chopping control. When the switch transistor T1 is switched off, the flyback diode D2, the motor winding L, and the switch transistor T2 will form the single diode circuit.

The working process is shown as follows:

When requiring the chopping control process, the switch transistors T1, T2 are cut off, the stored energy from the lower end of the motor winding L will pass through the flyback diode D1 and the capacitor C to the flyback diode D2. Then, the stored energy will pass from the flyback diode D2 back to the upper end of the motor winding L to form a charging circuit for the capacitor C. It is worth mentioning that the charging process is continuous as long as the switch transistors T1, T2 are cut off.

Accordingly, the charge process of capacitor C is completed when the current from the motor winding L is zero, i.e. the fully discharge. When the current of the motor winding L is dropped to zero, the voltage of the capacitor C reaches its maximum. At the mean time, the upper voltage end of the capacitor C is positive and the lower voltage end of the capacitor C is negative, wherein the capacitor C is connected to the control switches K1, K2, such that the capacitor C is started to discharge. The discharging current of the capacitor C flows from the upper end thereof through the control switch K1 and the upper end of the motor winding L to the lower end of the motor winding L. Then, the discharging current is guided to pass to the control switch K2 and back to the lower end of the capacitor C, so as to form the discharge circuit of the capacitor C. The discharging process of the capacitor C is continuous until the voltage at the upper and lower ends of the capacitor C is zero, i.e. the fully discharge thereof. At the mean time, the current at the motor winding L reaches its maximum. When the control switches K1, K2 are cut off, the motor winding L is then returned back to charge the capacitor C, such that the charging and discharging processes in a reciprocating manner will form a LC oscillation circuit. The energy conservation of the circuit will be end when the loss of energy reaches a preset threshold or the control cycle is end.

Figure 8:
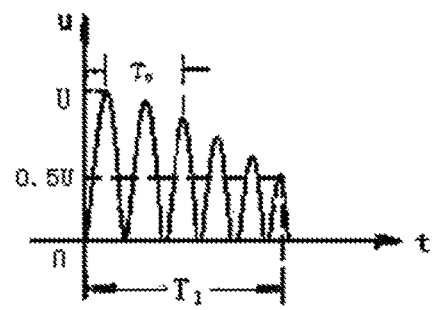
FIG. 8 is a schematic diagram illustrating the voltage waveform of capacitance C in FIG. 7 during oscillation.

FIG. 8 illustrates the waveform of the capacitor C. The current flow direction of the motor winding L is remained unchanged, i.e. from the upper end of the motor winding L to the lower end thereof. Therefore, through the energy circulation and regeneration process, the magnetic field is remained unchanged to achieve the requirement of the control system.

Through the normal process, when the current is reducing, the motor does not generate any work. During the energy circulation and regeneration process, the stored energy is discharged to generate work. In other words, the current discharged by the oscillation circuit configured with the motor winding L in a plurality of valid period will minimize the energy input to the motor. Therefore, under the same condition of the motor, the motor serves as an energy saving motor. In other words, the number of oscillation cycle of the oscillation circuit determines how much energy would be saved for the motor.

Figure 9:
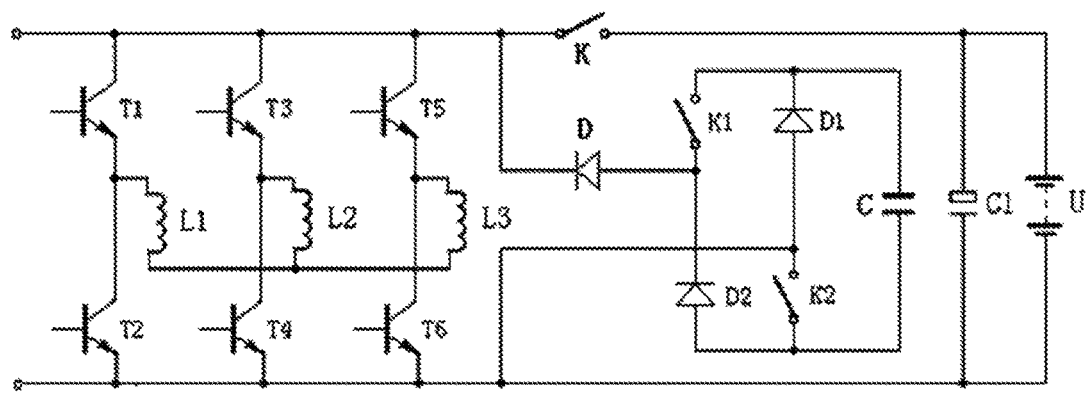
FIG. 9 is a schematic diagram illustrating the permanent magnet motor using a star-shaped winding.

Embodiment 4: FIG. 9 illustrates the circuit configuration of the permanent magnet motor is connected with a star-shaped winding connection structure. For the permanent magnet motor, the motor winding L is configured in a star-shaped winding connection configuration or a triangular winding connection configuration. Comparing with the switch type reluctance motor having a multi-phased control mode, the star-shaped winding connection configuration of the motor winding L has a two-phased control and the triangular winding connection configuration of the motor winding L has a three-phased control. Therefore, the requirement for incorporating with the energy circulation and regeneration process will be different. However, the current flow direction at the motor winding L will remained unchanged at each single point control cycle.

Accordingly, the power output circuit is a star-shaped winding connection. The power output circuit is configured to have a power source U, a plurality of switch transistors T1, T2, T3, T4, T5, T6, two flyback diodes D1, D2, a capacitor C, a plurality of control switches K, K1, K2, an isolating diode D, and a plurality of three-phased motor windings L1, L2, L3. Terminals of the switch transistors T1, T3, T5 are connected to a terminal of the control switch K while another terminal of the control switch K is connected to the positive terminal of the power source U. Another terminals of the switch transistors T1, T3, T5 are connected to the terminals of three-phased motor windings L1, L2, L3. Another terminals of the three-phased motor winding L1, L2, L3 are connected with each other. Terminals of the switch transistors T2, T4, T6 are connected to the terminals of the switch transistors T1, T3, T5 while another terminals of the switch transistors T2, T4, T6 are connected to the negative terminal of the power source U. The cathode terminal of the flyback diode D1 is connected to the capacitor C and the control switch K1 in parallel connection. The anode terminal of the flyback diode D1 is connected to a terminal of the control switch K2. The cathode terminal of the flyback diode D2 is connected to the terminal of control switch K2 while the anode terminal of the flyback diode D2 is connected to the capacitor C and the control switch K2 in parallel connection. A terminal of the isolating diode D is connected to the switch control K1 and the flyback diode D2, while another terminal of the isolating diode D is connected to the switch transistors T1, T3, T5 and the control switch K in parallel connection.

Accordingly, the switch transistors T1, T2, T3, T4, T5, T6 serve as the normal control structure for the permanent magnet motor which utilizes a H-bridge type upper and lower diode control mode. The terminals of the motor windings L1, L2, L3 (same terminal) are connected with each other, while the other terminals of the motor windings L1, L2, L3 are respectively connected to a mid-point of the upper and lower diodes. The control is that the switch transistor T1 is paired with the switch transistor T4, the switch transistor T3 is paired with the switch transistor T6, and the switch transistor T5 is paired with the switch transistor T2, wherein each pair is concurrently switched on or off. When the switch transistors T1, T4 are switched on, the current from the power source U will pass through the switch transistor T1, the motor winding L1, the mid-point, the motor winding L2, the switch transistor T4 and is grounded to form a circuit. At the mean time, the current flowing directions at the motor windings L1, L2 are opposite, such that the magnetic fields of the motor windings L1, L2 are opposite to fulfill the control requirement.

The working process is shown as follows:

When requiring chopping control, the control switch K is switched off to cut off the power source U. At the same time, when the switch transistors T1, T4 are remained unchanged and are switched on, the currents at the motor windings L1, L2 are discharged through the switch transistor T4 to the flyback diode D1. Therefore, the capacitor C is charged by the flyback diode D1. Then, the current will pass through the lower end of the capacitor C through the flyback diode D2, the isolating diode D, the switch transistor T1 and back to the motor winding L1 to form a charging circuit of the capacitor C.

The charging process of the capacitor C is completed when the currents in the motor windings L1, L2 are zero, i.e. the fully discharge. When the current of the charging circuit is zero, the voltage of the capacitor C reaches its maximum. At the same time, the upper voltage end of the capacitor C is positive and the lower voltage end of the capacitor C is negative. Then, the switch transistors K1, K2 are switched on to discharge the capacitor C. The discharging current is guided to pass through the positive end of the capacitor C, the control switch K1, the isolating diode D, the switch transistor T1, the motor winding L1, L2, the switch transistor T4, the control switch K2 and back to the negative end of the capacitor C to form a discharge circuit of the capacitor C. The discharge process of the capacitor C will be end when the voltage at the positive end and the negative end of the capacitor C is zero. At the mean time, the current at the motor winding reaches its maximum. When the control switches K1, K2 are cut off, the discharge process of the motor windings L will start again to charge the capacitor C, such that the charging and discharging processes in a reciprocating manner will form a LC oscillation circuit. The energy conservation of the circuit will be end when the loss of energy reaches a preset threshold or the control cycle is end.

FIG. 8 illustrates the waveform of the capacitor C. The current flow direction of the motor windings L1, L2 is remained unchanged, i.e. from the upper end of the motor winding L1 to the lower end thereof and from the lower end of the motor winding L2 to the upper end thereof. Therefore, through the energy circulation and regeneration process, the magnetic field is remained unchanged to achieve the requirement of the control system.

The process of the star-shaped winding connection configuration is similar to that of the triangular winding connection configuration.

It is worth mentioning that the energy circulation and regeneration process is that during the current chopping process, the energy stored in the motor winding is released and exchanged with the LC oscillation circuit so as to circulate the energy. As long as the circuit configuration and the valid parameters thereof, the energy loss during the oscillation process will be minimized so as to fully or maximizedly utilize the energy stored in the motor winding L.

The present invention further provides a motor-controlling method to release the energy stored in the motor winding to the yoke pole of the rotor in order to generate work. When using the flyback control mode-based controller for the flyback control mode of the motor, it controls the motor winding L to store energy when the motor has no work done, and to instantaneously release the energy to the yoke pole of the rotor in order to generate work. When using the flyback control mode-based controller for the forward control mode of the motor, it controls the motor winding L to store energy and to instantaneously release the energy to the yoke pole of the rotor in order to generate work.

Accordingly, the controlling method comprises the steps of:

(a) through the control circuit, configuring a control detection circuit to monitor any current change of a main circuit and to determine whether the main circuit is needed to connect to a power conversion circuit;

(b) through the control circuit, configuring a control switch at the power conversion circuit to selectively connect or disconnect the power conversion circuit with the main circuit;

(c) when the control circuit determines the process of energy conversion, activating the control switch via a pre-set control program to operatively connect the power conversion circuit with a motor winding to form an oscillation circuit, so as to continuously exchange the energy therebetween through oscillation until the energy stored in the motor winding drops below a predetermined threshold or the oscillation is stopped by the control program.

Accordingly, the above control method can controllably release the stored energy from the motor winding and exchange the stored energy thereof with an energy storing circuit through the oscillation. In other words, the motor winding can release the stored energy to the yoke pole of the rotor for generating work done. The process can be a reciprocating process until the energy stored in the motor winding drops below a predetermined threshold or the oscillation is stopped by the control program. The control method relies on the loading status of the control circuit with the energy circulation control. For the controller of the permanent magnet motor, the configuration of the power conversion circuit and the control parameters of the control circuit are set in the same control cycle, such that the current flow direction of the motor winding is remained unchanged.

For the non-permanent magnet type motor, the control method of the control circuit is shown as follows: activating the forward control mode of the motor that when the revolving speed of the motor reaches a predetermined speed threshold of the control program, shifting the motor from the forward control mode to the flyback control mode, and then, according to the loading status of the motor, controllably operating the motor among different working control modes of the flyback control, the flyback control with energy circulation control, the forward control alternating with the flyback control via the control circuit. For the permanent magnet type motor, the control method of the control circuit is shown as follows: activating the forward control mode of the motor that when the revolving speed of the motor reaches a predetermined speed threshold of the control program, selectively incorporating the energy circulation control via the control circuit in response to the loading status of the motor so as to controllably operate the motor with the corresponding control. It is worth mentioning that the configuration of the power conversion circuit and the control parameters of the control circuit are set in the same control cycle, such that the current flow direction of the motor winding is remained unchanged.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of controlling a flyback control mode-based controller for a motor having rotor and a motor winding, wherein the flybock control mode-based controller comprises a power supply circuit, a position detection circuit, a current detection circuit, a control circuit, and a power output circuit comprising an energy conversion unit which comprises a control switch and an energy conversion circuit in a controllable manner, wherein the method comprises the steps of:

in response to a position of the rotor detected by said position detection circuit, generating a corresponding positioning signal to control each phase of the motor winding to release stored energy through said power output circuit, generating work at the time when a power of the motor is cut off by the controller, configuring said energy conversion circuit to include at least one of a capacitor C circuit, an inductor L circuit, and a LC circuit, when a power supply of the motor is disconnected, inducting said capacitor C circuit, said inductor L circuit, and/or said LC circuit of said energy conversion circuit with the motor winding in parallel or in series to form an oscillation circuit, and pre-storing the energy in the motor winding to achieve attenuation of periodic oscillations.

2. The method according to claim 1, wherein said control switch is a bi-directional conduction switch having one terminal connected to a terminal of said energy conversion circuit and another terminal connected to a terminal of the motor winding, wherein the motor winding is connected with said energy conversion circuit, wherein said control switch is selectively actuated to cut off or connected said energy conversion circuit from the motor winding.

3. The method according to claim 2, wherein said energy output circuit is incorporated with a double-diode control, wherein said energy output circuit comprises a power source U, a two switch transistors T1, T2, two flyback diodes D1, D2, and a motor winding L having two endpoints A, B, wherein said switch transistor T1 has two terminals respectively connected to a positive terminal of said power source U and to said endpoint A where the terminal of said motor winding L is connected thereto, wherein another terminal of the motor winding L is connected the terminal of said switch transistor T2 at said endpoint B, wherein another terminal of said switch transistor T2 is connected to a negative terminal of said power source U, wherein a cathode terminal of said flyback diode D1 is connected to the positive terminal of said power source U at said endpoint B, wherein a cathode terminal of said flyback diode D2 is connected to the negative terminal of said power source U and an anode terminal of the flyback diode D2 is connected at said endpoint A, wherein control terminals of said switch transistors T1, T2 are connected to said control circuit, wherein said energy conversion unit is connected between said endpoints A, B, wherein said energy conversion unit comprises a control switch K and a capacitor C, wherein a terminal of said control switch K is connected at said endpoint A and another terminal of said control switch K is connected to one terminal said capacitor C, wherein another terminal of said capacitor C is connected at said endpoint B.

4. The method according to claim 2, wherein said energy output circuit is incorporated with a single diode control mode, wherein said energy output circuit is configured to include a power source U, two switch transistors T1, T2, two flyback diodes D1, D2, a capacitor C, and a motor winding L having two endpoints A, B, wherein said switch transistor T1 has two terminals respectively connected to a positive terminal of said power source U and to said endpoint A where a terminal of the motor winding L is connected thereto, wherein another terminal of the motor winding L is connected to negative terminal of said power source U at said endpoint B, wherein a terminal of said switch transistor T2 is connected to a terminal of said capacitor C and another terminal of said switch transistor T2 is connected at said endpoint B, wherein another terminal of said capacitor C is connected at said endpoint A, wherein a cathode terminal of said flyback diode D1 is connected to the positive terminal of said power source U while the negative terminal of said power source U is connected at said endpoint A, wherein said flyback diode D2 and said switch transistor T2 are connected in parallel, wherein a cathode terminal of the flyback diode D2 is connected to said capacitor C and an anode terminal of said flyback diode D2 is connected at said endpoint B.

5. The method according to claim 1, wherein when an attenuation is achieved via said energy conversion unit during a periodic oscillation, the current flow direction of the motor winding L is unchanged through a single control cycle.

6. The method according to claim 5, wherein said energy output circuit is incorporated with a single coil controlling mode, wherein said energy output circuit is configured to include a power source U, two switch transistors T1, T2, two flyback diodes D1, D2, a capacitor C, two control switches K1, K2, and a motor winding L having two endpoints A, B, wherein a terminal of said switch transistor T1 is connected to a positive terminal of said power source U while another terminal of said switch transistor T1 is connected to a terminal of the motor winding L at said endpoint A, wherein another terminal of the motor winding L is connected to a terminal of said switch transistor T2 at said endpoint B, wherein another terminal of said switch transistor T2 is connected to a negative terminal of said power source U, wherein a cathode terminal of said flyback diode D1 is connected to said capacitor C and an anode terminal of said flyback diode D1 is connected at said endpoint B, wherein a cathode terminal of said flyback diode D2 is connected at said endpoint A and an anode terminal of said flyback diode D2 is connected to the negative terminal of said power source U, wherein a terminal of said control switch K1 is connected at said endpoint A and another terminal of said control switch K1 is connected to said capacitor C, wherein a terminal of said control switch K2 is connected at said endpoint B and another terminal of said control switch K2 is connected to the negative terminal of said power source U, wherein another terminal of said capacitor C is connected to the negative terminal of said power source U.

7. The method flyback control mode-based controller according to claim 5, wherein said energy output circuit is incorporated with a star-shaped winding connection, wherein said power output circuit is configured to have a power source U, a plurality of switch transistors T1, T2, T3, T4, T5, T6, two flyback diodes D1, D2, a capacitor C, a plurality of control switches K, K1, K2, an isolating diode D, and a plurality of three-phased motor windings L1, L2, L3, wherein terminals of said switch transistors T1, T3, T5 are connected to a terminal of said control switch K while another terminal of said control switch K is connected to a positive terminal of said power source U, wherein another terminals of said switch transistors T1, T3, T5 are connected to terminals of three-phased motor windings L1, L2, L3, wherein another terminals of the three-phased motor winding L1, L2, L3 are connected with each other, wherein terminals of said switch transistors T2, T4, T6 are connected to terminals of said switch transistors T1, T3, T5 while another terminals of said switch transistors T2, T4, T6 are connected to a negative terminal of said power source U, wherein a cathode terminal of said flyback diode D1 is connected to said capacitor C and said control switch K1 in parallel connection, wherein an anode terminal of said flyback diode D1 is connected to a terminal of said control switch K2, wherein a cathode terminal of said flyback diode D2 is connected to the terminal of said control switch K2 while an anode terminal of said flyback diode D2 is connected to said capacitor C and said control switch K2 in parallel connection, wherein a terminal of said isolating diode D is connected to said switch control K1 and said flyback diode D2, while another terminal of said isolating diode D is connected to said switch transistors T1, T3, T5 and said control switch K in parallel connection.

8. A flyback motor controlling method, comprising the steps of:
controlling and releasing a stored energy in a motor winding to a yoke pole of a rotor for generating work done;
when a flyback control mode-based controller is used for a motor in a flyback control mode, ensuring the motor winding to store energy when the motor winding is idle, i.e. no work done, and to instantaneously release the stored energy to the yoke pole of the rotor for generating work done, and
when the flyback control mode-based controller is used for the motor in a forward control mode, ensuring the motor winding to store the energy and to release the stored energy to the yoke pole of the rotor for generating work done during an energy releasing process.

9. The flyback motor controlling method according to claim 8, which controllably releases the stored energy from the motor winding and exchange the stored energy thereof with an energy storing circuit through the oscillation, wherein the motor winding releases the stored energy to the yoke pole of the rotor for generating work done, wherein this process is a reciprocating process until the energy stored in the motor winding drops below a predetermined threshold or an oscillation is stopped by a control program.

10. The flyback motor controlling method according to claim 9, which relies on a loading status of the control circuit to determine whether an energy circulation control is activated for circulating the energy, wherein for the controller of a permanent magnet motor, a configuration of the power conversion circuit and control parameters of the control circuit are set in the same control cycle, such that a current flow direction of the motor winding is remained unchanged.

11. The flyback motor controlling method according to claim 10, which further comprises the steps of:
(a) through the control circuit, configuring a control detection circuit to monitor any current change of a main circuit and to determine whether the main circuit is needed to connect to a power conversion circuit;
(b) through the control circuit, configuring a control switch at the power conversion circuit to selectively connect or disconnect the power conversion circuit with the main circuit; and
(c) when the control circuit determines a process of energy conversion, activating the control switch via the control program to operatively connect the power conversion circuit with the motor winding to form an oscillation circuit, so as to continuously exchange the energy therebetween through oscillation until the energy stored in the motor winding drops below a predetermined threshold or the oscillation is stopped by the control program.

12. The flyback motor controlling method according to claim 9, wherein for a non-permanent magnet type motor, activating a forward control mode of the motor that when a revolving speed of the motor reaches a predetermined speed threshold of the control program, shifting the motor from the forward control mode to the flyback control mode, and then, according to the loading status of the motor, controllably operating the motor among different working control modes of the flyback control, the flyback control with energy circulation control, the forward control alternating with the flyback control via the control circuit, wherein for a permanent magnet type motor, activating the forward control mode of the motor that when the revolving speed of the motor reaches a predetermined speed threshold of the control program, selectively incorporating the energy circulation control via the control circuit in response to the loading status of the motor so as to controllably operate the motor with the corresponding control, wherein a configuration of the power conversion circuit and control parameters of the control circuit are set in the same control cycle, such that the current flow direction of the motor winding is remained unchanged.

13. The flyback motor controlling method according to claim 8, wherein for a non-permanent magnet type motor, activating a forward control mode of the motor that when a revolving speed of the motor reaches a predetermined speed threshold of the control program, shifting the motor from the forward control mode to the flyback control mode, and then, according to the loading status of the motor, controllably operating the motor among different working control modes of the flyback control, the flyback control with energy circulation control, the forward control alternating with the flyback control via the control circuit, wherein for a permanent magnet type motor, activating the forward control mode of the motor that when the revolving speed of the motor reaches a predetermined speed threshold of the control program, selectively incorporating the energy circulation control via the control circuit in response to the loading status of the motor so as to controllably operate the motor with the corresponding control, wherein a configuration of the power conversion circuit and control parameters of the control circuit are set in the same control cycle, such that the current flow direction of the motor winding is remained unchanged.

* * * * *